United States Patent
Alecu et al.

(10) Patent No.: US 10,443,503 B2
(45) Date of Patent: Oct. 15, 2019

(54) FUEL SYSTEM FOR A GAS TURBINE ENGINE

(71) Applicant: PRATT & WHITNEY CANADA CORP., Longueuil (CA)

(72) Inventors: Daniel Alecu, Brampton (CA); Steven Strecker, Erin (CA); Andrew Walz, Toronto (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 448 days.

(21) Appl. No.: 14/670,915

(22) Filed: Mar. 27, 2015

(65) Prior Publication Data

US 2016/0281656 A1 Sep. 29, 2016

(51) Int. Cl.
| F02C 7/236 | (2006.01) |
| F02C 7/14  | (2006.01) |
| F02C 7/224 | (2006.01) |
| F28D 21/00 | (2006.01) |
| F02C 7/232 | (2006.01) |

(52) U.S. Cl.
CPC ............. *F02C 7/236* (2013.01); *F02C 7/14* (2013.01); *F02C 7/224* (2013.01); *F02C 7/232* (2013.01); *F05D 2260/213* (2013.01); *F05D 2260/601* (2013.01); *F28D 2021/0049* (2013.01); *F28F 2250/06* (2013.01); *Y02T 50/672* (2013.01)

(58) Field of Classification Search
CPC .. F02C 7/22; F02C 7/224; F02C 7/232; F02C 7/236; F02C 7/14; F28F 2250/06; F05D 2260/601; F05D 2260/213; F23K 5/04; F23K 5/142; F28D 2021/0049; Y02T 50/675

See application file for complete search history.

(56) References Cited

U.S. PATENT DOCUMENTS

| 4,041,697 A   | 8/1977 | Coffinberry et al. |              |
|---------------|--------|--------------------|--------------|
| 4,073,136 A * | 2/1978 | Symon ............. | F02C 7/22    |
|               |        |                    | 60/39.093    |
| 4,339,917 A * | 7/1982 | LaGrone .......... | F02C 7/236   |
|               |        |                    | 137/565.32   |
| 4,696,156 A * | 9/1987 | Burr ............... | F01D 25/18   |
|               |        |                    | 60/39.08     |
| 5,203,174 A * | 4/1993 | Meyer ............. | F02C 7/224   |
|               |        |                    | 60/734       |
| 5,438,823 A   | 8/1995 | Loxley et al.      |              |
| 5,896,737 A * | 4/1999 | Dyer ............... | F02C 9/263   |
|               |        |                    | 60/39.281    |

(Continued)

FOREIGN PATENT DOCUMENTS

WO    WO 2014060751 A1 *  4/2014   ............ B64D 37/34

*Primary Examiner* — Alain Chau
(74) *Attorney, Agent, or Firm* — Norton Rose Fulbright Canada

(57) ABSTRACT

A gas turbine fuel system including a main fuel line providing fuel flow from a fuel tank to a combustor, and at least one pump, including an ejector pump, pumping fuel from the fuel tank to the combustor via a fuel metering unit. The fuel metering unit directs a portion of the fuel into a motive flow line which returns a portion of the fuel to the ejector pump. First and second heat exchangers are disposed in serial flow communication within the main fuel line between the pump and the fuel metering unit. The first heat exchanger is a fuel-to-fuel heat exchanger.

14 Claims, 2 Drawing Sheets

(56) References Cited

U.S. PATENT DOCUMENTS

| | | | | |
|---|---|---|---|---|
| 7,007,452 B1* | 3/2006 | Baryshnikov | ........... | F02C 7/232 60/39.094 |
| 7,216,487 B2* | 5/2007 | Parsons | ................ | F02C 7/236 60/39.281 |
| 7,260,926 B2* | 8/2007 | Sabatino | ............... | B64D 37/34 60/206 |
| 7,845,177 B2* | 12/2010 | Parsons | .................... | F02C 9/30 60/39.281 |
| 7,997,062 B2* | 8/2011 | Sun | ....................... | F01D 25/18 60/266 |
| 8,661,783 B2* | 3/2014 | Foster | ................... | F02C 7/224 165/109.1 |
| 9,091,212 B2* | 7/2015 | Veilleux, Jr. | ........... | F02C 9/263 |
| 9,752,507 B2* | 9/2017 | Selstad | .................. | F02C 7/224 |
| 2005/0279079 A1* | 12/2005 | Baryshnikov | ........... | F02C 7/232 60/39.094 |
| 2006/0117757 A1* | 6/2006 | Tanaka | ................... | F02C 7/185 60/772 |
| 2013/0036738 A1* | 2/2013 | Pora | ....................... | F02C 7/224 60/734 |
| 2013/0306265 A1* | 11/2013 | Appukuttan | ............. | F02C 7/14 165/11.1 |
| 2014/0165571 A1* | 6/2014 | Vertenoeuil | ............ | F02C 7/232 60/734 |
| 2014/0290266 A1* | 10/2014 | Veilleux, Jr. | ............ | F02C 9/263 60/776 |
| 2015/0048617 A1* | 2/2015 | Veilleux, Jr. | ............. | F02C 7/14 290/52 |
| 2015/0361887 A1* | 12/2015 | Stearns | .................... | F02C 7/06 60/772 |
| 2016/0230669 A1* | 8/2016 | Selstad | .................. | F02C 7/224 |
| 2016/0298547 A1* | 10/2016 | Ripley | ................... | F02C 7/224 |

\* cited by examiner

FUEL SYSTEM FOR A GAS TURBINE ENGINE

TECHNICAL FIELD

The application relates generally to gas turbine engines and, more particularly, to gas turbine engine fuel systems.

BACKGROUND

Aircraft fuel systems which are used in conjunction with gas turbine engines ensure fuel flows from one or more fuel tanks of the aircraft to a combustor of the gas turbine engines, where the fuel is burned to provide power to the engines. The fuel in such a fuel system may be become mixed with residual amounts of water or misty air. At high temperatures, such residual amounts of water turn into vapor. At low ambient temperatures, however, residual water in the fuel may turn into ice. Further, fuel may be exposed to extremely cold temperatures (well below freezing) at high altitude, which can lead to the formation of ice particles in the fuel pipes. Left unchecked, these ice particles may at the very least reduce the efficiency of the fuel system and at the worst could block elements of the fuel system when in operation.

SUMMARY

In one aspect, there is provided a fuel system for a gas turbine engine having a combustor that is fed fuel from a fuel tank, the fuel system comprising: a main fuel line providing fuel flow from the fuel tank to the combustor; at least one pump pumping fuel from the fuel tank to the combustor via a fuel metering unit, the at least one pump including an ejector pump, the fuel metering unit directing a portion of the fuel into a motive flow line, the motive flow line providing return of the portion of the fuel to the ejector pump; and a first heat exchanger and a second heat exchanger disposed in serial flow communication within the main fuel line between the at least one pump and the fuel metering unit, the second heat exchanger being downstream from the first heat exchanger, the first heat exchanger being a fuel-to-fuel heat exchanger providing heat transfer communication between the main fuel line and the motive flow line.

In another aspect, there is provided a method of heating fuel in a fuel system of a gas turbine engine, the method comprising: flowing fuel through a main fuel line between a fuel tank and a combustor of the gas turbine engine, including feeding the fuel through a first heat exchanger and a second heat exchanger disposed in series within the main fuel line; using a fuel metering unit in the main fuel line downstream of the second heat exchanger to divide the fuel into at least a motive flow and a burn flow; and directing the motive flow through the first heat exchanger to an ejector pump upstream of the first heat exchanger, the first heat exchanger transferring heat from the motive flow to the fuel in the main fuel line.

DESCRIPTION OF THE DRAWINGS

Reference is now made to the accompanying figures in which.

DETAILED DESCRIPTION

Figure 1:
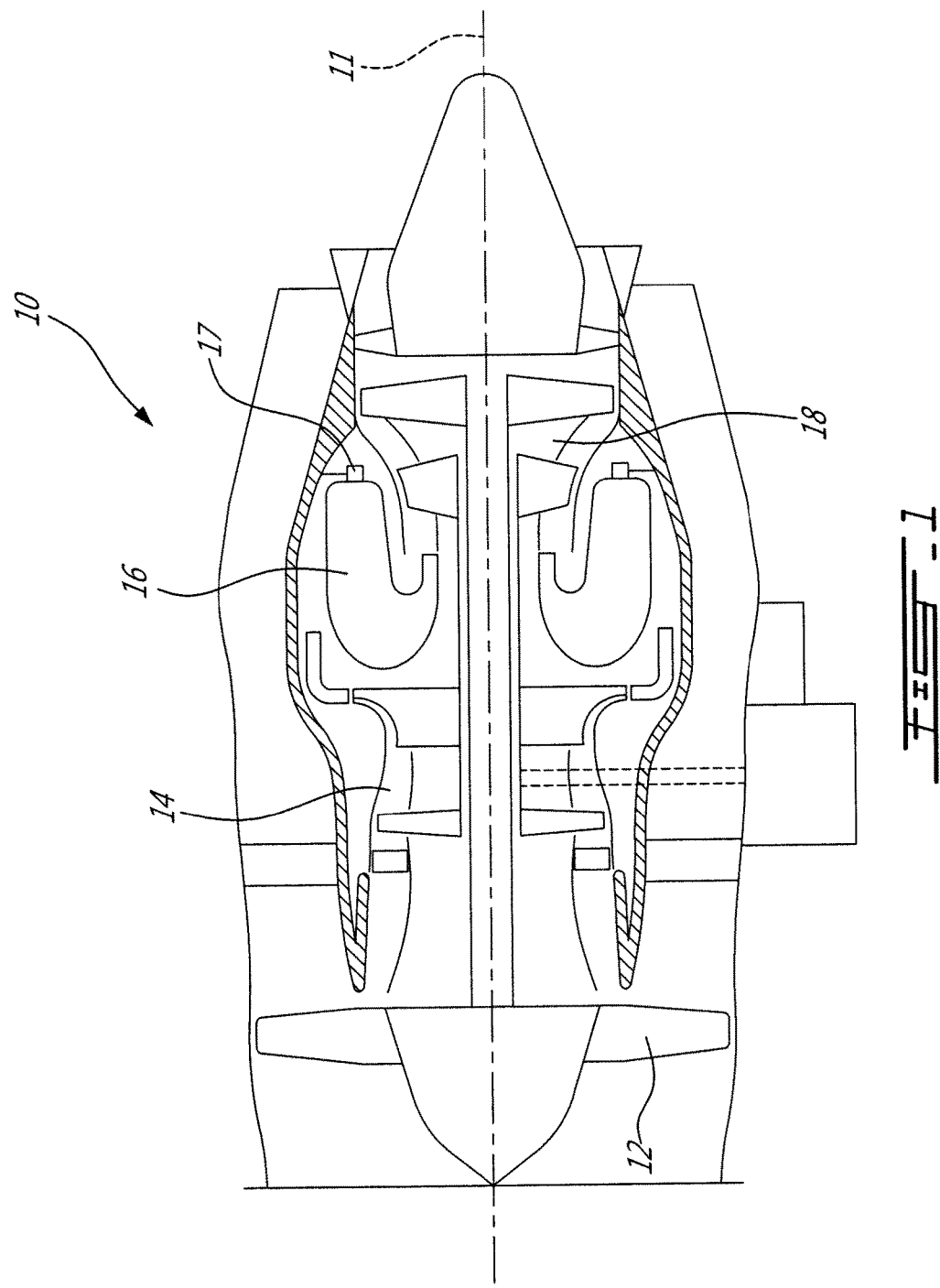
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
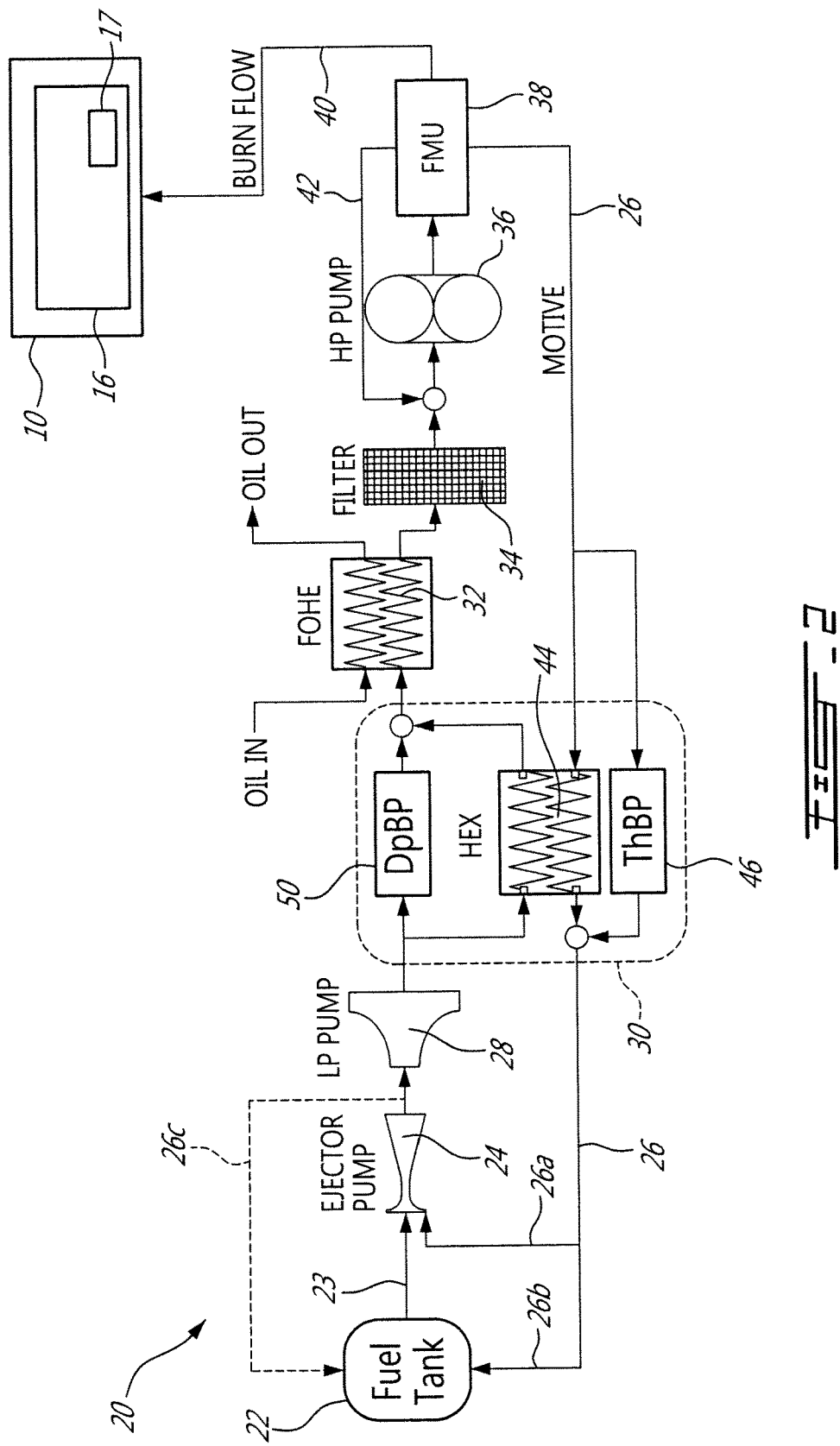
FIG. 2 is a schematic of a fuel system for the gas turbine engine of FIG. 1.

Referring now to FIG. 2, a fuel system 20 in accordance with the present disclosure is described which feeds fuel from one or more fuel tanks 22 to the combustor 16 of the gas turbine engine 10 via fuel nozzles 17. In operation fuel is first ejected from a fuel tank 22 by an ejector pump 24 and into a main fuel line 23 of the fuel system 20. The ejector pump 24, which may be either located directly within the fuel tank(s) 22 or downstream thereof, pumps the fuel out of the fuel tank(s) 22 using a motive flow 26. The motive flow 26, having a kinetic energy, draws or aspirates the fuel out and through the main fuel line 23 by Venturi effect. Once the fuel is pumped out of the fuel tank 22, it goes through a low pressure (LP) pump 28. The low pressure pump 28 provides a relatively small increase in pressure to the fuel but displaces large volumes of fuel though the main fuel line 23 of the fuel system 20. The low pressure pump 28 may be any pump that accomplishes the above and that may be sufficiently robust to cavitation, foreign object impact and usual wear.

The fuel in the main fuel line 23 pressurized by the low pressure pump 28 is then directed to a first heat exchange assembly, or simply heat exchanger, 30. The first heat exchanger 30 pre-heats, the fuel using the hotter motive fuel flow 26, in a manner which will be described below. From the first heat exchanger 30, the fuel enters a second heat exchanger 32 which in this embodiment is a Fuel-to-Oil Heat Exchanger (FOHE) 32. Hot oil circulates through the second heat exchanger 32, i.e. the FOHE, and further heats the fuel as a result. The engine oil in the FOHE 32 provides sufficient heat at mild ambient temperatures to heat the main fuel line 23 to positive temperatures before the fuel is delivered to the combustor 16. Fuel heaters other than a FOHE could be used to reheat the fuel. For example, an air cooled heat exchanger could be used. Many different types of FOHE could also be used. For example fin-plate, tube-shell, concentric FOHE, dimpled tube FOHE, single, double, triple pass, parallel flow, counter flow, cross flow, mixed flow.

After the FOHE 32, the fuel flows through a fuel filter 34. The filter 34 may block any particle or foreign object present in the main fuel line 23. From the filter 34, the fuel goes to a high pressure (HP) pump 36 which increases the pressure of the fuel in a substantial manner relative to the low pressure pump 28, so that the fuel may later be ejected in a jet-like manner in the combustor 16. The high pressure pump 36 can be a gear pump or any type of pump which produces a high pressure output. While the high pressure pump 36 is designed to pump the fuel at the high pressure required by the fuel nozzles of the combustor 16, it may have poor suction capability, which in turn may require the use of the low pressure pump 28 upstream the high pressure pump 36. The high pressure pump 36 delivers the high pressure fuel to a Fuel Metering Unit (FMU) 38 which modulates the amount of the high pressure fuel delivered to the combustor 16. A portion of the high pressure fuel is sent to the combustor 16. This portion is known as is burn flow 40. Fuel flow that is not sent to the combustor 16 is apportioned into two flows, the motive flow 26 and an excess flow 42 that is returned back to the main fuel line 23 upstream of the high pressure pump 36.

The motive fuel flow 26, which is at relative high pressure and temperature due to its passage through the high pressure pump 36 and the FOHE 32, flows through the heat exchange assembly 30 before a portion 26a of it reaches the ejector pump 24 for actuating it, and another portion 26b discharges back into the fuel tank 22. The portion 26b could be replaced by a portion 26c (shown in phantom) linking the flow between the ejector pump 24 and the low pressure pump 28 back to the fuel tank 22. The motive flow 26 thereby preheats the fuel in the main fuel line 23 downstream of the low pressure pump 28 and upstream of the FOHE 32. Consequently, the motive flow 26 is cooled down after passing through the heat exchange assembly 30.

The heat exchange assembly 30 includes a fuel-to-fuel heat exchanger (F-F HEX) 44. The two fuels flowing through the HEX 44 are the motive flow 26 and the fuel from the main fuel line 23 after it has passed through the low pressure pump 28. The motive flow 26 being hotter than the fuel of the main fuel line 23, the fuel of the main fuel line 23 flowing through the HEX 44 is heated by the motive flow 26, which is itself consequently cooled. Heating the fuel at the heat exchange assembly 30 in addition to heating it at the FOHE 32 may increase the overall temperature of the fuel, and thereby decrease possible ice formation in the fuel system 20 during icing conditions. In addition, cooling the motive flow 26 minimizes heat transfer to the fuel tank 22 for the portion 26b of the motive flow 26 returned to the fuel tank 22. A fraction of the resulting water that may be present in the main fuel line 23 may be found in the motive flow 26. However, icing in the HEX 44 may be prevented by high dispersion, low concentration due to the gradual melting, extremely low dwell time therein, and by the motive flow 26 pressurization.

The heat exchange assembly 30 may include a thermal bypass valve (ThBP) 46 disposed parallel to the motive flow line 26, around the HEX 44. The thermal bypass valve 46 may force the motive flow 26 to bypass the HEX 44 if the temperature of the motive flow line 26 exceeds a pre-determined temperature. During power reduction at high altitude, such as end of climb or initiation of descent, both the engine oil temperature and the fuel temperature out of the FOHE 32 may surge over a preferred limit due to engine oil system thermal inertia. Under the mentioned transient conditions, the thermal bypass valve 46 may open and re-route the motive flow 26 away from the HEX 44 in order to reduce the heat transfer from the motive flow 26 into the main fuel line 23. For example, when the aircraft reaches cruise altitude, the engine power is reduced and so is the engine fuel consumption. The reduced burn fuel 40 flow may carry away less heat and become hotter while the engine oil cools at a slow rate. The fuel motive flow 26 being heated above the predetermined temperature (i.e. when a threshold is crossed), it will force open the thermal bypass valve 46. Because the HEX 44 is bypassed, the hot motive flow 26 will reach the main fuel line 23 un-cooled and without heating the incoming fuel flow 23. The cooler incoming flow 23 will cool better the engine oil. The hotter motive flow 26 will start warming up the fuel tank 22 as it is being dumped in the tank 22. The engine thermal inertia is much lower than the fuel tank thermal inertia, meaning that the engine will cool more and faster than the fuel tank 22 warms up. Once the engine cools sufficiently, the motive flow 26 temperature drops and the thermal bypass valve 46 closes.

The thermal bypass valve 46 could be replaced by any other valve which would bypass the HEX 44 upon reaching a pre-determined condition. For example, a commanded valve could replace the thermal bypass valve 46. The commanded valve may react to signals external to the fuel system 20, such as ambient pressure reaching a certain level. In one example, the commanded valve may use engine oil temperature as feed-back variable. In another example, the thermal bypass valve 46 may be replaced by a dual function pressure release and thermal valve.

The heat exchange assembly 30 may also include a pressure bypass valve (DpBP) 50 disposed parallel to the main fuel line 23, around the HEX 44. The pressure bypass valve 50 allows to bypass the HEX 44 in case of pressure in the fuel flow line 23 crosses a threshold. If the HEX 44 is blocked partially or totally by ice or foreign objects, pressure in the main fuel line 23 may rise. Upon crossing a threshold of pressure, the HEX 44 is bypassed, and the fuel flows directly from the low pressure pump 28 to the FOHE 32. Bypassing the HEX 44, allows the effects of transient ice ingestion to be mitigated. Transient ice ingestion occurs typically at mild positive ambient temperature with extremely cold fuel in the aircraft main fuel tank 22. The ice deposits may be released suddenly by the fuel line 23 due to surrounding warm ambient. In case the ice blocks the HEX 44, the pressure bypass valve 50 opens and re-routes the fuel of the main fuel line 23 by bypassing the HEX 44 and reaching directly the FOHE 32. Subsequently all the motive flow heat is available to gradually melt the ice until the HEX 44 is completely ice free. A length of pipe between the pressure bypass valve 50 and the HEX 44 may be chosen to ensure enough buffer volume for the ice release such that no ice is released through the pressure bypass valve 50. The pressure bypass valve 50 could be replaced by any other valve which would bypass the main fuel line 23 upon reaching a pre-determined condition.

When the HEX 44 is either partially blocked by ice or completely blocked and bypassed (the pressure bypass valve), the warm motive flow 26 melts progressively the ice in the HEX 44. The water from the ice is dispersed in the main fuel line 23, most of it being released into the engine combustor 16 but part of it traveling in the motive flow 26. This water could re-freeze in the HEX 44, however such freezing would have a limited existence due to the water dispersion and low concentration in the motive flow 26 (the ice melts progressively). The motive flow 26 pressure is higher than atmospheric which slightly lower the water freezing point. The given slug of motive flow 26 may need little time to pass the HEX 44 thus the sub-cooled water droplets may have no time to freeze ("low dwell time").

The high pressure motive flow 26 serves a double purpose in the flow system 20. Not only the motive flow 26 drives the ejector pump 24, but also to pre-heat the fuel before it is sent to the combustor 16. The pre-heating may extend the operating temperatures range of the engine fuel system 20 and make it more tolerant to transient ice ingestion. The pre-heated flow of fuel is further heated by the FOHE 32 which may ensure that the filter 34 remains ice free. In the embodiment shown in FIG. 2, the heat exchange system 30 using the fuel-to-fuel HEX 44 is disposed immediately downstream of the low pressure pump 28 and immediately upstream of the FOHE 32. It is however contemplated that the heat exchange assembly 30 may be disposed elsewhere on the main fuel line 23, upstream of the FOHE 32. For example, the heat exchange assembly 30 could be upstream of the low pressure pump 28 or upstream of the ejector pump 24.

The present fuel system 20 may have a lower weight and complexity, while providing higher reliability than either auxiliary motive flow pumps or air cooled oil coolers. Also, it may provide a practical solution to transient ice ingestion in the fuel system 20. In addition, the presented heat exchange assembly 30 may be retrofitted in existing fuel systems.

While the motive flow 26 is shown herein to power the ejector pump 24, it is contemplated that the motive flow 26 could power elements of the gas turbine engine 10 other than the ejector pump 24, and/or could power more than one element. By cooling the motive flow 26 before it reaches the element, one may use the motive flow 26 for systems which have airframe temperatures limitations. For example, composite airframes have material temperature limitations which make them unable to accept a hot un-cooled motive flow. In addition, some aircrafts have motive systems in the airframe that require the use of an auxiliary motive flow pump to provide motive flow at an acceptable temperature. The present fuel system 20 alleviates the use of such auxiliary motive flow pump, which in turn may reduce weight, complexity and failure modes to the engine 10. It is also contemplated that the fuel system 20 could have more than one motive flows 26, some of the motive flows being used for the ejector pump 24 exclusively and other motive flows being used for the HEX 44 exclusively.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. A fuel system for a gas turbine engine having a combustor that is fed fuel from a fuel tank, the fuel system comprising:
   a main fuel line providing fuel flow from the fuel tank to the combustor;
   at least one pump pumping fuel from the fuel tank to the combustor via a fuel metering unit, the at least one pump including an ejector pump, the fuel metering unit directing a portion of the fuel into a motive flow line, the motive flow line providing return of the portion of the fuel to the ejector pump;
   a first heat exchange assembly and a second heat exchanger disposed in serial flow communication within the main fuel line between the at least one pump and the fuel metering unit, the second heat exchanger being downstream from the first heat exchange assembly;
   the first heat exchange assembly including a fuel-to-fuel heat exchanger, the fuel-to-fuel heat exchanger providing heat transfer communication between the main fuel line and the motive flow line; and
   a motive bypass line on the motive flow line bypassing the fuel-to-fuel heat exchanger and having a motive bypass valve, in parallel with the fuel-to-fuel heat exchanger, and a main bypass line in the main fuel line bypassing the fuel-to-fuel heat exchanger and having a main bypass valve, in parallel with the fuel-to-fuel heat exchanger, the motive bypass valve being a thermal bypass valve configured to open when a temperature threshold is crossed to redirect fuel within the motive flow line through the motive bypass line, and the main bypass valve being a pressure bypass valve configured to open when a pressure threshold is crossed to redirect fuel from the main fuel line through the main bypass line.

2. The fuel system of claim 1, wherein the second heat exchanger provides heat transfer communication from a source of heat external to the main fuel line to the fuel in the main fuel line.

3. The fuel system of claim 2, wherein the second heat exchanger is a fuel-to-oil heat exchanger, the fuel-to-oil heat exchanger providing heat transfer communication between the main fuel line and an oil line of an oil system of the gas turbine engine, to transfer heat from oil in the oil line to the fuel in the main fuel line.

4. The fuel system of claim 1, wherein a first portion of the fuel of the main fuel line is directed by the fuel metering unit to the combustor, and the fuel within the motive flow that is redirected by the motive bypass valve into the motive flow line is a second portion of the fuel.

5. The fuel system of claim 1, wherein the fuel system further comprises a low pressure pump disposed in the main fuel line downstream of the ejector pump and upstream of the first heat exchange assembly.

6. The fuel system of claim 1, wherein the fuel system further comprises a high pressure pump disposed in the main fuel line downstream of the second heat exchanger and upstream of the fuel metering unit.

7. The fuel system of claim 6, wherein a first portion of the fuel of the main fuel line is directed by the fuel metering unit to the combustor, the portion of the fuel of the main fuel line directed into the motive flow line is a second portion of the fuel, and the fuel metering unit selects a third portion of the fuel from the main fuel line and injects said third portion back into the main fuel line upstream of the high pressure pump.

8. The fuel system of claim 1, wherein the motive bypass valve is a commanded valve receiving inputs from sources external to the fuel system.

9. The fuel system of claim 1, wherein the ejector pump is on the main fuel line, and a portion of the fuel in the main fuel line is redirected right after the ejector pump into the fuel tank.

10. The fuel system of claim 1, wherein a portion of the motive flow line provides return of the fuel directly to the fuel tank.

11. A method of heating fuel in a fuel system of a gas turbine engine, the method comprising:
   flowing fuel through a main fuel line between a fuel tank and a combustor of the gas turbine engine, including feeding the fuel through a first heat exchanger and a second heat exchanger disposed in series within the main fuel line, the first heat exchanger being a fuel-to-fuel heat exchanger;
   using a fuel metering unit in the main fuel line downstream of the second heat exchanger to divide the fuel into at least a motive flow and a burn flow;
   directing the motive flow through the fuel-to-fuel heat exchanger to an ejector pump upstream of the fuel-to-fuel heat exchanger, the fuel-to-fuel heat exchanger transferring heat from the motive flow to the fuel in the main fuel line;
   bypassing the fuel-to-fuel heat exchanger in the motive flow when a temperature threshold is crossed; and
   bypassing the fuel-to-fuel heat exchanger in the main fuel line when a pressure threshold is crossed.

12. The method of claim 11, wherein the second heat exchanger is providing heat transfer communication from a source of heat external to the main fuel line to the fuel in the main fuel line.

13. The method of claim 12, wherein the second heat exchanger is an fuel-to-oil heat exchanger, the method further comprising directing hot oil from an oil system of the gas turbine engine through the second heat exchanger, the second heat exchanger providing heat transfer from the hot oil to the fuel of the main fuel line.

14. The method of claim 11, wherein the step of dividing the fuel in the main fuel line further comprises directing a portion of the fuel to a high pressure pump disposed in the main fuel line downstream of the second heat exchanger and upstream of the fuel metering unit.

* * * * *